(12) United States Patent
Yebka et al.

(10) Patent No.: US 9,853,473 B2
(45) Date of Patent: Dec. 26, 2017

(54) BATTERY PACK ASSEMBLY AND METHOD

(71) Applicant: Lenovo (Singapore) Pte. Ltd., New Tech Park (SG)

(72) Inventors: Bouziane Yebka, Apex, NC (US); Philip John Jakes, Durham, NC (US); Joseph Anthony Holung, Wake Forest, NC (US); Tin-Lup Wong, Chapel Hill, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 538 days.

(21) Appl. No.: 14/512,970

(22) Filed: Oct. 13, 2014

(65) Prior Publication Data

US 2016/0105053 A1    Apr. 14, 2016

(51) Int. Cl.
| | |
|---|---|
| B60L 11/18 | (2006.01) |
| B60W 20/00 | (2016.01) |
| H01M 10/052 | (2010.01) |
| B60R 16/033 | (2006.01) |
| H02J 7/00 | (2006.01) |
| H01M 10/44 | (2006.01) |
| H01M 2/34 | (2006.01) |
| H01M 10/04 | (2006.01) |
| G06F 1/28 | (2006.01) |
| H02J 7/34 | (2006.01) |
| G06F 1/16 | (2006.01) |

(52) U.S. Cl.
CPC .............. *H02J 7/0063* (2013.01); *G06F 1/28* (2013.01); *H01M 2/348* (2013.01); *H01M 10/0445* (2013.01); *H01M 10/441* (2013.01); *G06F 1/1635* (2013.01); *H01M 2200/106* (2013.01); *H01M 2220/20* (2013.01); *H01M 2220/30* (2013.01); *H02J 7/34* (2013.01); *H02J 2007/0067* (2013.01)

(58) Field of Classification Search
CPC ........ H02J 7/0063; H02J 1/00; H01M 10/441; H01M 10/443; B60R 16/033
USPC .................................. 320/117, 121; 307/9.1
See application file for complete search history.

(56) References Cited

U.S. PATENT DOCUMENTS

| | | | |
|---|---|---|---|
| 2003/0015992 A1* | 1/2003 | Dubac | H02J 7/0003 320/121 |
| 2009/0096419 A1* | 4/2009 | White | B60L 11/1861 320/118 |
| 2009/0208824 A1* | 8/2009 | Greening | G06F 1/189 429/91 |
| 2009/0325056 A1* | 12/2009 | Greening | G06F 1/189 429/121 |
| 2011/0309681 A1* | 12/2011 | Kamijima | H02J 7/0013 307/66 |

(Continued)

*Primary Examiner* — Jared Fureman
*Assistant Examiner* — Win Htun
(74) *Attorney, Agent, or Firm* — Dean D. Small; The Small Patent Law Group, LLC (57) ABSTRACT

A battery pack assembly includes a first battery cell supplying electric current to an electronic load, a second battery cell supplying electric current to the electronic load, and a first switch operatively coupled with the first battery cell and the electronic load. The first switch stops conduction of the electric current to the electronic load responsive to an increase in electric demand of the electronic load above a designated threshold. A method of powering an electronic load using a battery pack assembly also is provided.

16 Claims, 4 Drawing Sheets (56) References Cited

U.S. PATENT DOCUMENTS

| | | | |
|---|---|---|---|
| 2012/0104856 A1* | 5/2012 | Gottlieb | H02J 1/10 307/66 |
| 2012/0268070 A1* | 10/2012 | Park | H01M 10/441 320/126 |
| 2013/0009605 A1* | 1/2013 | Hongo | H01M 4/505 320/134 |
| 2013/0162217 A1* | 6/2013 | Gaul | H02J 7/00 320/134 |
| 2013/0181526 A1* | 7/2013 | Iwasaki | H01M 10/441 307/43 |
| 2014/0117784 A1* | 5/2014 | Weissinger, Jr. | H02J 7/0026 307/150 |
| 2014/0217986 A1* | 8/2014 | Skipper | H02J 7/0057 320/134 |
| 2014/0239896 A1* | 8/2014 | Takeshita | H02J 7/0024 320/117 |
| 2014/0354054 A1* | 12/2014 | Katou | H02J 7/0029 307/43 |
| 2015/0035494 A1* | 2/2015 | Suzuki | H01M 10/441 320/134 |
| 2015/0202985 A1* | 7/2015 | Le | B60L 11/1877 307/9.1 |
| 2015/0222117 A1* | 8/2015 | Im | H02J 7/0019 307/52 |
| 2015/0295420 A1* | 10/2015 | Cheng | H02J 7/0003 320/128 |
| 2015/0298630 A1* | 10/2015 | Iwai | B60R 16/033 320/135 |
| 2016/0023571 A1* | 1/2016 | Wu | B60L 11/1864 320/103 |
| 2016/0049814 A1* | 2/2016 | Sugiyama | H02J 7/0021 320/128 |
| 2016/0094056 A1* | 3/2016 | Dulle | H02J 7/007 320/126 |
| 2016/0134131 A1* | 5/2016 | Murayama | H02J 50/12 307/104 |

* cited by examiner

BATTERY PACK ASSEMBLY AND METHOD

FIELD

Embodiments of the subject matter described herein relate to battery assemblies and methods.

BACKGROUND

Battery pack assemblies include battery cells that supply electric current (e.g., direct current) to electronic loads to power the loads. The cells may be separate batteries that are connected in series or parallel with each other to supply the loads with power. Many battery pack assemblies have the ability to power a wide variety of loads. These loads can have varying power demands. For example, laptop computers and electric vehicles may need to have battery pack assemblies having relatively large energy storage capacities. Power tools may need battery pack assemblies that can provide relatively large amounts of power. Computers (e.g., server systems) and lights may need battery pack assemblies that can provide power over extended periods of time.

With increasing processing capabilities of loads such as computers and mobile workstations, the power demands on battery pack assemblies continue to increase. For example, newer mobile workstations may require the ability to power the workstations for extended periods of time (referred to as "run times") to reduce the frequency and duration of recharging times for the battery pack assemblies, but also may require the ability to draw significant amounts of current and power from the battery pack assemblies. These workstations may demand relatively large pulses of current over time periods that are longer than can be provided by some known capacitors. Additionally, the battery pack assemblies for such workstations typically need to be relatively small to fit inside and/or otherwise couple with the workstations in a non-obtrusive manner. Some known battery pack assemblies can have relatively long run times, but may not be able to meet the increased pulse demands of the workstations.

BRIEF DESCRIPTION

In one embodiment, an assembly (e.g., a battery pack assembly) includes a first battery cell supplying electric current to an electronic load, a second battery cell supplying electric current to the electronic load, and a first switch operatively coupled with the first battery cell and the electronic load. The first switch stops conduction of the electric current to the electronic load responsive to an increase in an electric demand of the electronic load above a designated threshold.

In another embodiment, a method (e.g., for supplying current to an electronic load from a battery pack assembly) includes conducting electric current from a first battery cell of a hybrid battery pack assembly to an electronic load, and preventing conduction of the electric current to the electronic load responsive to an increase in an electric demand of the electronic load above a designated threshold. The method also includes conducting electric current from a second battery cell of the hybrid battery pack assembly to the electronic load.

In another embodiment, a powered system includes a battery pack assembly including a first battery cell and a second battery cell, an electronic load consuming electric current supplied by the first battery cell and the second battery cell to perform work, and a first switch operatively coupled with the first battery. The first switch switches to a blocking state to stop conduction of the electric current from the first battery cell to the electronic load and to a conducting state to conduct the electric current from the first battery cell to the electronic load. The first switch is in the conducting state during a low demand time period of the electronic device and in the blocking state during a high demand time period of the electronic device. The low demand time period occurring responsive to an electric demand of the electronic load being no greater than a designated threshold, and the high demand time period occurring responsive to the electric demand of the electronic load exceeding the designated threshold.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
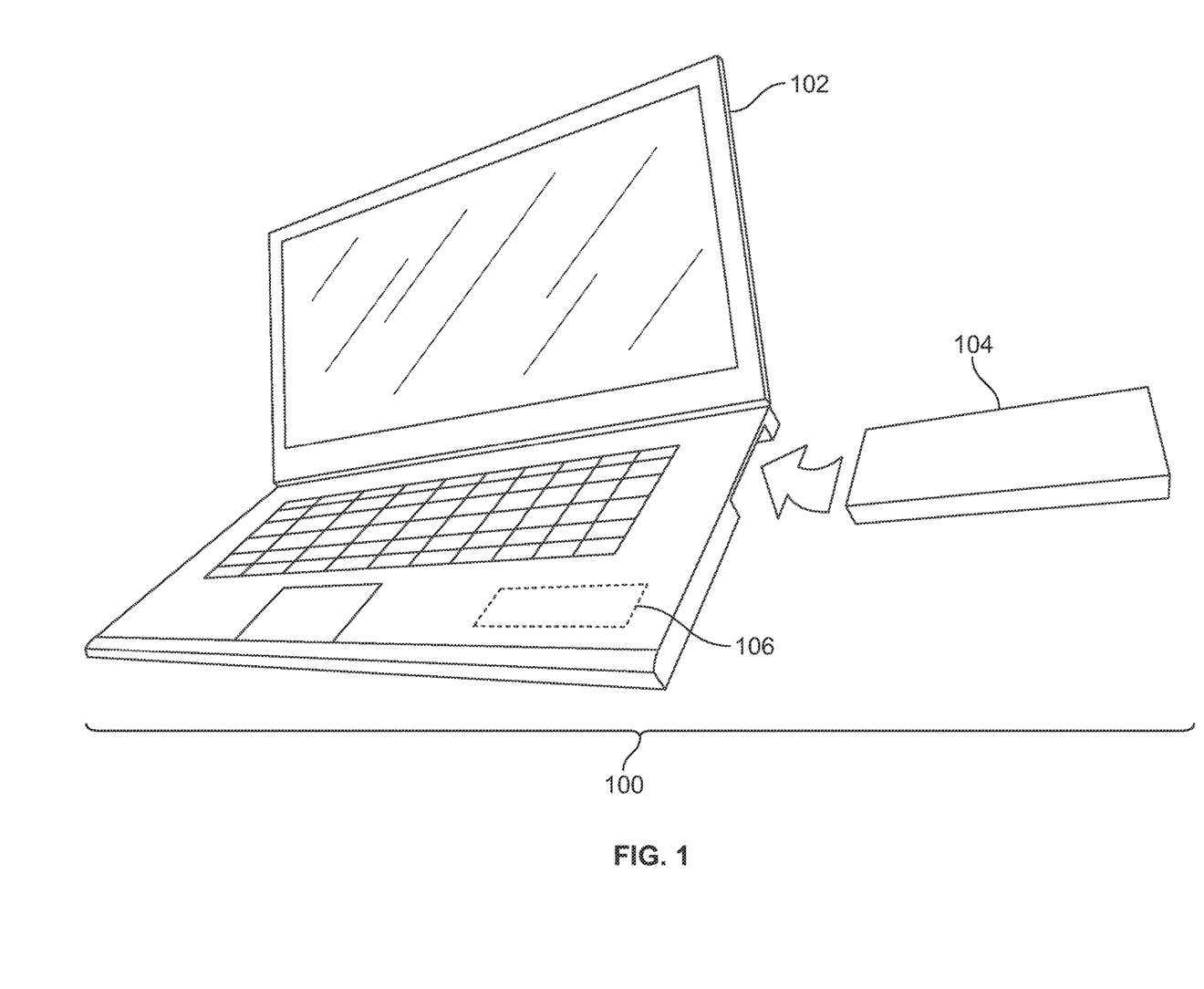
FIG. 1 illustrates a perspective view of a powered system according to one embodiment of the subject matter described herein.

FIG. 1 illustrates a perspective view of a powered system 100 according to one embodiment of the subject matter described herein. The powered system 100 includes an electronic load 102 and a battery pack assembly 104. In the illustrated embodiment, the powered system 100 can represent a mobile computing system, such as a mobile computer device (e.g., a laptop computer, tablet computer, smartphone, or other computer device) having one or more components (e.g., the load 102) that are powered by the battery pack assembly 104 to perform work, such as microprocessors, graphic processors, wireless transceiving circuitry, displays, touchscreens, or the like, that process data, generate displays, wirelessly communicate, receive input, or the like. Alternatively, the powered system 100 may not be a mobile computer device. For example, the powered system 100 may be one or more vehicles, power tools, vacuums, communication devices (e.g., radios, mobile phones, etc.), lights, or the like.

The battery pack assembly 104 supplies electric current to the load 102 to power the load 102. The powered system 100 in the illustrated embodiment operates using software and/or performs various types of data processing, such as graphic processing, audio processing, and the like. The battery pack assembly 104 can include several rechargeable batteries or battery cells that supply the load 102 with electric current to power the load 102.

In one embodiment, the battery pack assembly 104 can be referred to as a hybrid battery pack assembly that includes some battery cells (also referred to as batteries) dedicated to supplying the load 102 with electric current during time periods of low demand by the load 102 (referred to herein as "low demand time periods") and other battery cells dedicated to supplying the load 102 with electric current during time periods of high demand by the load 102 (referred to herein as "high demand time periods"). For example, during time periods that the load 102 demands relatively low current and/or power, such as when the load 102 is idle, is operating word processing software, or the like, a first set of the battery cells in the battery pack assembly 104 may be supplying current to the load 102. Responsive to the current and/or power demand from the load 102 increasing above one or more thresholds, the battery pack assembly 104 can stop one or more of these battery cells from supplying current to the load 102 while one or more other battery cells supply current to the load 102. As a result, a different, second set of the battery cells supplies current to the load 102. In one aspect, all or substantially all of the battery cells in the battery pack assembly 104 can provide electric current to the load 102 during the low demand time period and a subset of all or substantially all of the battery cells in the battery pack assembly 104 can provide electric current to the load 102 during the high demand time period. Alternatively, some of the battery cells may be dedicated to only supplying the load 102 with current during the low demand time periods and other battery cells may be dedicated to only supplying the load 102 with current during the high demand time periods. In another embodiment, battery cells may not be solely dedicated to only providing current during low or high demand time periods. Instead, one or more of the battery cells may provide current during both the low and high demand time periods, while one or more other battery cells may provide current during only the low demand time period or only the high demand time period.

Controlling which battery cells in the battery pack assembly 104 provide current to the load 102 based on the current and/or power demanded by the load 102 can increase performance of the battery pack assembly 104. For example, dedicating some battery cells to providing current only during high demand time periods can allow the battery pack assembly 104 to provide relatively large amounts of current (e.g., at least two amps, at least four amps, at least six amps, at least ten amps, or another amount), to provide relatively high pulses of electric power (e.g., at least two hundred watts, at least two hundred forty watts, at least two hundred fifty watts, or the like, for at least three seconds, at least five seconds, or the like), and/or to provide relatively long cycle or run lives for the load 102 (e.g., can power the load 102 for at least eight hours, at least ten hours, at least twelve hours, at least fifteen hours, or another time period, of continuous use) when compared to battery packs that do not dedicate battery cells in this manner.

In one aspect, the powered system 100 can include a controller 106 that monitors and/or controls operations of the powered system 100. The controller 106 can represent hardware circuits or circuitry that include and/or are connected with one or more processors (e.g., computer microprocessors, microcontrollers, or the like). The controller 106 may monitor electric demand of the load 102 to determine whether to switch which of the battery cells in the battery pack assembly 104 are to provide current to the load 102. For example, the controller 106 can measure how much current, power, voltage, or the like, is demanded by the load 102 and compare the demanded current, power, voltage, or the like (e.g., the electric demand), to one or more designated thresholds. Responsive to the electric demand exceeding the one or more designated thresholds, the controller 106 can direct the battery pack assembly 104 to change which cells power the load 102 and which cells do not power the load 102, as described herein. Alternatively, the battery pack assembly 104 can change which cells power the load 102 without direction from the controller 106 or another component of the powered system 100.

Figure 2:
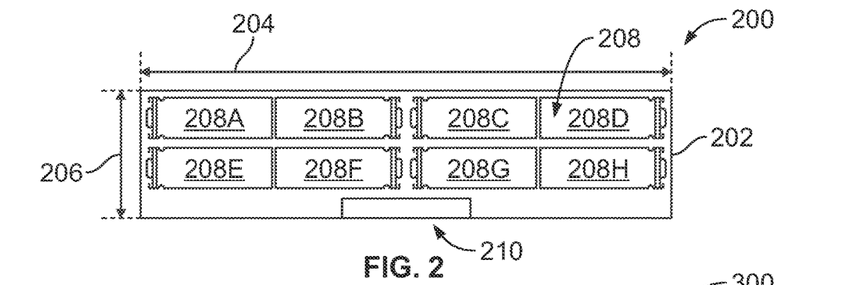
FIG. 2 is a cross-sectional view of a battery pack assembly according to one embodiment.

FIG. 2 is a cross-sectional view of a battery pack assembly 200 according to one embodiment. The battery pack assembly 200 can represent the battery pack assembly 104 shown in FIG. 1. The battery pack assembly 200 includes an outer housing 202 having outer dimensions that are sufficiently small to allow for the battery pack assembly 200 to be at least partially installed in the load 102 (shown in FIG. 1). For example, the housing 202 may have a width dimension 204 of 250 millimeters or less, 260 millimeters or less, or another distance, a height dimension (along a direction that extends into and out of the plane of FIG. 2) of 10 millimeters or less, 13 millimeters or less, or another distance, and/or a depth dimension 206 of 70 millimeters or less, 73 millimeters or less, or another distance.

The battery pack assembly 200 includes several rechargeable battery cells 208 (e.g., cells 208A-H). In the illustrated example, the battery pack assembly 200 includes eight battery cells 208. Alternatively, a larger or smaller number of battery cells 208 may be provided. The battery cells 208 can be conductively coupled with each other in series and/or in parallel. The battery cells 208 can be conductively coupled with conductive terminals 210 of the battery pack assembly 200. The battery cells 208 can be connected with the terminals 210 such that, when the battery pack assembly 200 is coupled with the load 102, the terminals 210 engage corresponding terminals of the load 102 so that electric current can be conducted from the battery cells 208 to the load 102 (e.g., to power the load 102) and/or from the load 102 to the battery cells 208 (e.g., to charge the battery cells 208). The terminals 210 can include one or more cathode terminals and/or one or more anode terminals.

Figure 3:
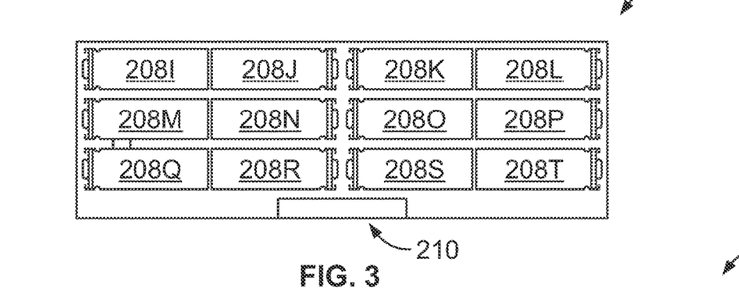
FIG. 3 is a cross-sectional view of a battery pack assembly according to another embodiment.

FIG. 3 is a cross-sectional view of a battery pack assembly 300 according to another embodiment. The battery pack assembly 300 can represent the battery pack assembly 104 shown in FIG. 1. The battery pack assembly 300 includes an outer housing that may be similar or identical to the housing 202 shown in FIG. 2. The battery pack assembly 300 includes several of the rechargeable battery cells 208 (e.g., cells 208I-T). In the illustrated example, the battery pack assembly 300 includes twelve battery cells 208. Alternatively, a larger or smaller number of battery cells 208 may be provided. Similar to in the battery pack assembly 200, the battery cells 208 in the battery pack assembly 300 can be conductively coupled with each other in series and/or in parallel. The battery cells 208 also can be connected with conductive terminals 210 of the battery pack assembly 300. The terminals 210 can include one or more cathode terminals and/or one or more anode terminals.

Different battery cells 208 in the battery pack assemblies 104, 200, 300 (shown in FIGS. 1-3) can be used to power the load 102 during different amounts of demanded current and/or power from the load 102. By way of example, the battery cells 208B and 208C in the battery pack assembly 200 and/or the battery cells 208J, 208K, 208N, and 208O in the battery pack assembly 300 can be dedicated to supplying current to the load 102 during high demand time periods while one or more other battery cells 208 or all of the remaining battery cells 208 in the battery pack assemblies 200, 300 are dedicated to supplying current to the load 102 during low demand time periods. The battery cells 208 dedicated to supplying current during the low demand time periods may not supply current during the high demand time periods. Alternatively, a different set of the battery cells 208 may be dedicated to supplying current during the high demand time period and/or the low demand time period. In one embodiment, the battery cells 208 dedicated to supplying current during the high demand time period may also supply current to the load 102 during the low demand time periods as well. Alternatively, the battery cells 208 dedicated to supplying current during the high demand time period may not supply current to the load 102 during the low demand time periods as well.

Figure 4:
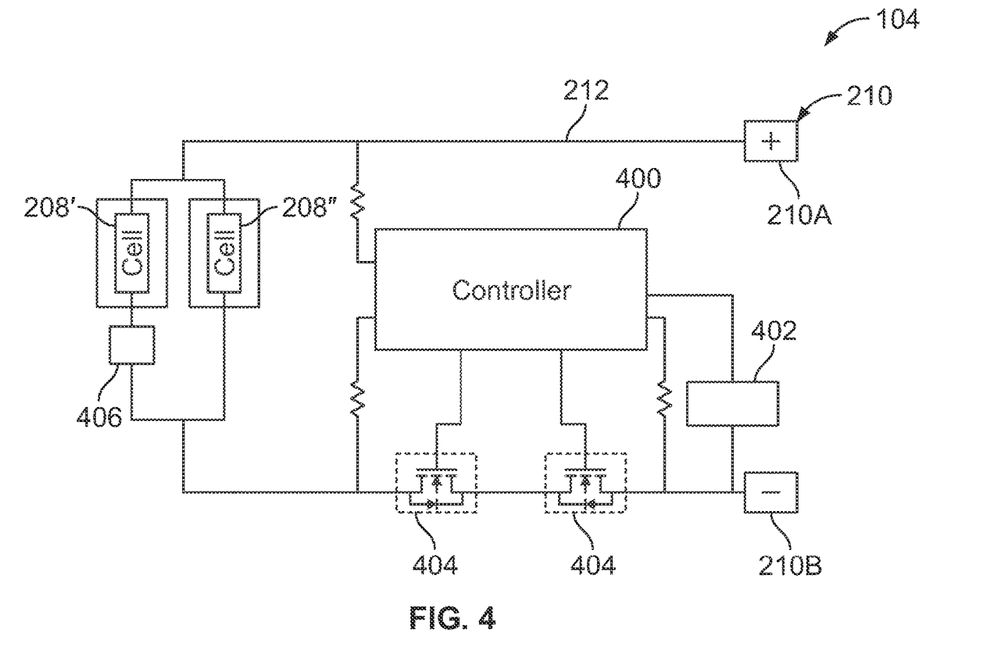
FIG. 4 is a circuit diagram of the battery pack assembly shown in FIG. 1 according to one embodiment.

FIG. 4 is a circuit diagram of the battery pack assembly 104 shown in FIG. 1 according to one embodiment. The diagram shown in FIG. 4 also may represent the circuit diagram for the battery pack assembly 200 and/or 300 shown in FIGS. 2 and 3. The battery pack assembly 104 includes several components that are conductively coupled by conductive buses 212. The buses 212 are conductively coupled with the terminals 210, which can include one or more anode terminals 210A and one or more cathode terminals 210B.

A controller 400 monitors operating characteristics of the battery pack assembly 104 to protect the battery pack assembly 104 and/or the load 102 from damage. The controller 400 can represent one or more integrated circuits, one or more computer processors, or other devices that operate based on hard-wired logic, software, or the like, to monitor the battery pack assembly 104. In one aspect, the controller 400 can be referred to as a protection integrated circuit, and can monitor the voltage of the electric energy stored in one or more of the battery cells 208. The controller 400 optionally can monitor temperatures of the battery pack assembly 104. For example, a temperature-sensitive device 402, such as one or more thermistors or other devices, may be operatively coupled with the controller 400. The temperature-sensitive device 402 can indicate temperatures of the battery pack assembly 104 to the controller 400. For example, the electrical resistance of the temperature-sensitive device 402 can change based on temperatures of the battery pack assembly 104. The controller 400 can monitor the resistance of the device 402 to determine or estimate the temperature of the battery pack assembly 104.

In the illustrated embodiment, the battery pack assembly 104 includes field effect transistors (FETs) 404 conductively coupled with the battery cells 208 and the cathode terminal 210B between the battery cells 208 and the cathode terminal 210B. Alternatively, one or more of the FETs 404 may be disposed elsewhere in the battery pack assembly 104. The controller 400 can be operatively connected with the FETs 404 in order to monitor the direction and/or magnitude of the current being conducted between the battery cells 208 and the cathode terminal 210B. For example, the controller 400 can be conductively coupled with the FETs 404 in order to monitor voltage drops across the FETs 404. These voltage drops and/or changes in the voltage drops with respect to time can represent the direction and/or magnitude of current being conducted along one or more buses 212 between the battery cells 208 and the terminals 210. Alternatively, another type of sensing device may be used in place of the FETs 404 to monitor direction and/or magnitude of the current conduction.

The controller 400 can control conduction of current between the battery cells 208 and the terminals 210 based on the operating characteristics of the battery pack assembly 104 that are monitored by the controller 400. For example, in response to detecting a temperature increase above a designated temperature threshold, an increase in the magnitude of current being conducted by the buses 212 above a designated current threshold, a change in the direction of the current being conducted by the buses 212, or the like, the controller 400 can open one or more of the FETs 404 to stop conduction of the current in the battery pack assembly 104. Alternatively, the controller 400 may open one or more other switches in the battery pack assembly 104.

Two battery cells 208' and 208" are shown in FIG. 4. Each of these battery cells 208', 208" can represent a single battery cell 208, two or more battery cells 208 connected in parallel with each other, or two or more battery cells 208 connected in series with each other. The battery cell 208' may be referred to as a low demand battery cell 208' and the battery cell 208" may be referred to as a high demand battery cell 208". The battery cells 208', 208" are connected with the anode and cathode terminals 210A, 210B in parallel to each other between the anode and cathode terminals 210A, 210B in the illustrated embodiment.

The battery cell 208' is conductively coupled with a switch 406. The switch 406 operates to open or close to prevent or allow conduction of current from and/or to the battery cell 208'. For example, the switch 406 can be closed to conduct current from the battery cell 208' to the terminals 210, or from the terminals 210 to the battery cell 208'. The switch 406 can be opened to stop conduction of the current from the battery cell 208' to the terminals 210, or from the terminals 210 to the battery cell 208'. In the illustrated embodiment, the switch 406 is between the battery cell 208' and the terminal 210B. Alternatively, the switch 406 may be in another location.

The switch 406 may not control conduction of current from and/or to the battery cell 208" in one embodiment. For example, as shown in FIG. 4, the switch 406 can be positioned between the battery cell 208' and the terminal 210B, but not between the battery cell 208" and the terminals 210, such that opening the switch 406 does not prevent current from being conducted from the battery cell 208" to the terminals 210 and/or from the terminals 210 to the battery cell 208". Alternatively, the switch 406 can be positioned to also control conduction of current from and/or to the battery cell 208".

The switch 406 can operate by opening in response to an increase in the electric energy demanded by an electronic load (e.g., the load 102 shown in FIG. 1). For example, the switch 406 can include a positive temperature coefficient (PTC) device. Such a device can change the amount of resistance of the device 406 in response to temperature changes in the device 406. As the electronic load 102 demands more current and/or power from the battery pack assembly 104 via the terminals 210, the temperature of the device 406 can increase. As the temperature increases, the resistance of the device 406 also can increase. If the demanded current exceeds a designated current threshold and/or the demanded power exceeds a designated power threshold, then the resistance of the device 406 may become sufficiently large to prevent conduction of current from the battery cell 208' to the load 102 via the terminals 210. For example, the device 406 may effectively act as an open switch. Alternatively, the device 406 can represent a switch (e.g., a solid state switch or the like), that is controlled by the controller 400. The controller 400 can open the device 406 responsive to the current and/or power demanded by the load 102 exceeding one or more thresholds.

During time periods of low demand by the load 102, the switch 406 may be a sufficiently low temperature so that the switch 406 has a lower resistance. As a result, current may be conducted between the battery cell 208' and the load 102, and between the battery cell 208" and the load 102. As a result, the load 102 can be powered by the battery cells 208' and 208". But, during periods of high demand by the load 102, the switch 406 can prevent conduction between the battery cell 208' and the load 102 such that the load 102 is powered by the battery cell 208", but not the battery cell 208'.

As one example, the switch 406 can stop conduction of current from or to the battery cell 208' responsive to the current demanded by the load 102 exceeding a threshold of at least two amps, at least four amps, at least six amps, at least eight amps, at least fifteen amps, at least twenty amps, or another amount. The switch 406 can allow conduction of the current from and/or to the battery cell 208' responsive to the current demanded by the load being no greater than this threshold.

As another example, the switch 406 can stop conduction of current from or to the battery cell 208' responsive to the power demanded by the load 102 exceeding a designated power threshold for at least a designated time period. The power threshold and the time threshold can be referred to as a designated pulse threshold. For example, the power demanded by the load 102 can exceed the pulse threshold when the demanded power exceeds the power threshold over a time period that is longer than the time threshold. On the other hand, the power demanded by the load 102 may not exceed the pulse threshold when the demanded power does not exceed the power threshold and/or when the demanded power exceeds the power threshold but for a time period that is not longer than the time threshold. In one embodiment, the power threshold may be at least 200 watts, at least 240 watts, at least 250 watts, or another amount. The time threshold may be at least three seconds, at least five seconds, or another time period.

The time threshold may be longer than a capacitor can provide the demanded power. For example, some capacitors may be able to store sufficient energy to supply the load 102 with the demanded power or at least enough power to meet or exceed the power threshold. But, the capacitors may be unable to continue providing this much power for at least the time threshold.

In operation, the terminals 210 can be conductively coupled with conductive terminals (e.g., contacts) of the load 102. The load 102 can draw current from the battery cells 208 to power the load 102. During time periods that the current demanded by the load 102 does increase sufficiently high and/or the power demanded by the load 102 does not increase sufficiently high (and/or for sufficiently long) to cause the switch 406 to block conduction of the current from the battery cell 208', both the battery cell 208' and the battery cell 208" may provide current to the load 102. But, when the current and/or power demanded by the load 102 increase by sufficient amounts to cause the switch 406 to prevent conduction of current from the battery cell 208', only the battery cell 208" may supply current to the load 102.

In the eight cell 208 embodiment of the battery assembly pack 104 shown in FIG. 2 as the pack 200, the battery cell 208' may represent the battery cells 208A, 208D, 208E, 208F, 208G, and 208H connected in series and/or parallel, or another number and/or combination of the battery cells 208, while the battery cell 208" may represent the battery cells 208B, 208C connected in series or in parallel, or another number and/or combination of the battery cells 208. In the twelve cell 208 embodiment of the battery assembly pack 104 shown in FIG. 3 as the pack 300, the battery cell 208' may represent the battery cells 208M, 208N, 208O, 208P, 208Q, 208R, 208S, and 208T connected in series and/or parallel, or another number and/or combination of the battery cells 208, while the battery cell 208" may represent the battery cells 208I, 208J, 208K, and 208L connected in series and/or in parallel, or another number and/or combination of the battery cells 208.

Figure 5:
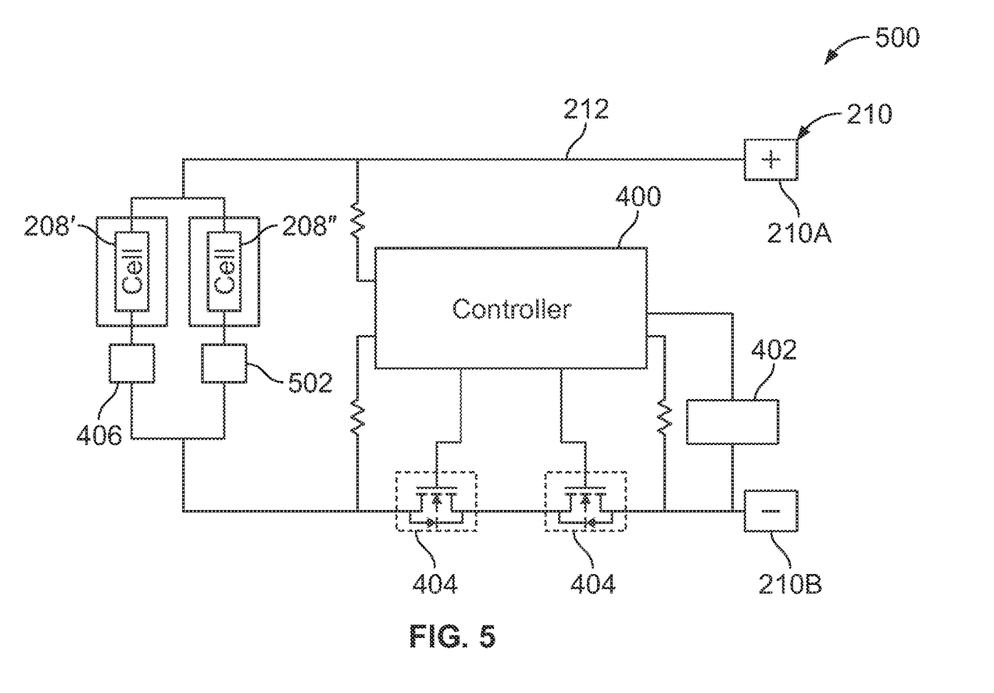
FIG. 5 is a circuit diagram of a battery pack assembly according to another embodiment.

FIG. 5 is a circuit diagram of a battery pack assembly 500 according to another embodiment. The diagram shown in FIG. 5 may represent the circuit diagram for the battery pack assembly 104, 200, and/or 300 shown in FIGS. 1-3. The battery pack assembly 500 includes many of the same components as the battery pack assembly 104 shown in FIG. 4.

One difference between the battery pack assembly 104 shown in FIG. 4 and the battery pack assembly 500 shown in FIG. 5 is the addition of a switch 502. The switch 502 may be the same as the switch 406 except that the switch 502 is operatively coupled with the battery cell 208". Similar to the switch 406, the switch 502 can control when the battery cell 208" supplies current to the load 102 and when the battery cell 208" is prevented from supplying current to the load 102. For example, during low demand time periods, the switch 406 can allow the battery cell 208' to supply current to the load 102 while the switch 502 prevents the battery cell 208" from supplying current to the load 102. During high demand time periods, the switch 406 can prevent the battery cell 208' from powering the load 102, while the switch 502 allows the battery cell 208" to power the load 102. As a result, in one embodiment, the battery cell 208" may only supply current to the load 102 when the current and/or power demanded by the load 102 exceeds one or more thresholds described herein.

In one aspect of the various embodiments described herein, controlling which battery cells 208 supply current to the load 102 during different time periods based on the current and/or power demanded by the load 102 can allow the battery pack assembly 104 to supply large amounts of current to the load 102 (e.g., by using batteries such as high power lithium batteries or other batteries as the cells 208), to supply large amounts of power to the load 102 (e.g., at least 200 watts or another amount), and to supply large pulses of power to the load 102 (e.g., to supply at least 200 watts or another amount for at least three seconds or longer), all while the battery pack assembly 104 continues to power the load 102 for relatively long run times of eight hours or longer (or another length of time). Dedicating some battery cells 208 to meeting the high current, high power, and/or high pulse demands of the load 102 can allow the other battery cells 208 to power the load 102 during lower current, lower power, and/or lower pulse time periods, which can extend the run life of the battery pack assembly 104 and the load 102 relative to battery pack assemblies that do not dedicate battery cells 208 in this manner.

The inventors of the subject matter described herein have found that controlling the battery cells 208 in this manner can increase the total time period that the battery pack assemblies 104, 200, 300, 500 can power the load 102, without reducing the amount of current or power supplied to the load 102 relative to other battery pack assemblies. For example, Table 1 below illustrates non-limiting examples of the current and power supplied by battery pack assemblies having eight and twelve battery cells that are not controlled according to one or more embodiments described herein. Table 2 illustrates non-limiting examples of the increased current and/or power supplied by the battery pack assemblies 104, 200, 300, 500 having eight and twelve battery cells that are controlled according to one or more embodiments described herein.

TABLE 1

| Charge | Current (A) | Power (Wh) | |
|---|---|---|---|
| | | (8 cells) | (12 cells) |
| 2.00 Ah | 20 | 57 | 86 |
| 2.10 Ah | 20 | 60 | 90 |

TABLE 2

| Charge | Current (A) | Power (Wh) | |
|---|---|---|---|
| | | (8 cells) | (12 cells) |
| 2.00 Ah | 10-20 | 68 | 100 |
| 2.10 Ah | 10-20 | 92 | 133 |

As shown by a comparison of Tables 1 and 2, operating the battery pack assemblies as described herein can unexpectedly increase the watt-hours supplied by the battery pack assemblies 104, 200, 300, 400 having eight battery cells 208 from 57 Wh to 68 Wh when the battery cells 208 are charged with 2.00 Ah of energy. This represents an increase of 19% in the energy that can be supplied by the battery pack assemblies 104, 200, 300, 500 relative to other eight cell battery pack assemblies that are not operated in this manner.

As another example, operating the battery pack assemblies as described herein can unexpectedly increase the watt-hours supplied by the battery pack assemblies 104, 200, 300, 400 having eight battery cells 208 from 60 Wh to 92 Wh when the battery cells 208 are charged with 2.10 Ah of energy. This represents an increase of 53% in the energy that can be supplied by the battery pack assemblies 104, 200, 300, 500 relative to other eight cell battery pack assemblies that are not operated in this manner.

Also as shown by a comparison of Tables 1 and 2, operating the battery pack assemblies as described herein can unexpectedly increase the watt-hours supplied by the battery pack assemblies 104, 200, 300, 400 having twelve battery cells 208 from 86 Wh to 100 Wh when the battery cells 208 are charged with 2.00 Ah of energy. This represents an increase of 16% in the energy that can be supplied by the battery pack assemblies 104, 200, 300, 500 relative to other eight cell battery pack assemblies that are not operated in this manner.

As another example, operating the battery pack assemblies as described herein can unexpectedly increase the watt-hours supplied by the battery pack assemblies 104, 200, 300, 400 having twelve battery cells 208 from 90 Wh to 133 Wh when the battery cells 208 are charged with 2.10 Ah of energy. This represents an increase of 47% in the energy that can be supplied by the battery pack assemblies 104, 200, 300, 500 relative to other eight cell battery pack assemblies that are not operated in this manner.

Figure 6:
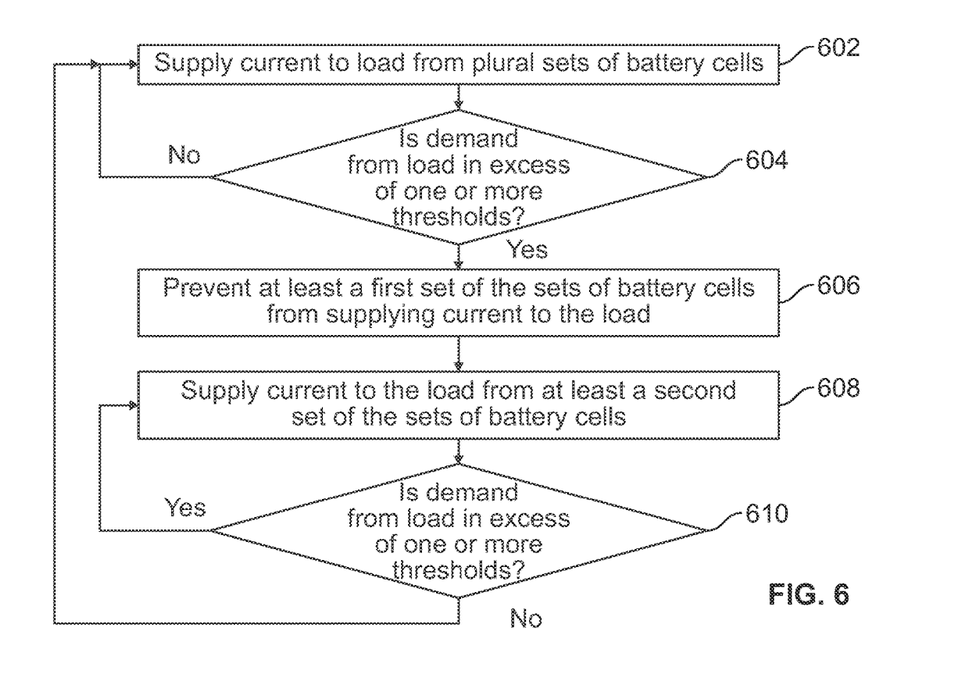
FIG. 6 illustrates a flowchart of a method for supplying current to an electronic load from a battery pack assembly according to one embodiment.

FIG. 6 illustrates a flowchart of a method 600 for supplying current to an electronic load from a battery pack assembly according to one embodiment. The method 600 may be performed using one or more embodiments of the battery pack assemblies shown and described herein, or may be performed by a different battery pack assembly. At 602, current is supplied from battery cells in the battery pack assembly. In one aspect, different sets of the battery cells may concurrently supply the current to the load. Alternatively, only one or more, but not all, of the sets of the battery cells supplies the current to the load while one or more other sets, or all other sets, of the battery cells do not supply the current to the load. This time period may be referred to as the low demand time period described above.

At 604, a determination is made as to whether the load is demanding current in excess of one or more thresholds. For example, the current and/or power demanded by the load can be compared to the current threshold, the power threshold, and/or the pulse threshold described above. If the current and/or power demanded by the load exceeds one or more of these thresholds, then a change may need to be made as to which battery cells supply current to the load to prevent all of the battery cells from being drained of electric energy too soon.

If the current and/or power demanded by the load does exceed one or more of these thresholds, then flow of the method 600 can proceed to 606. Alternatively, if the current and/or power demanded by the load does not exceed these thresholds, then flow of the method 600 can return to 602.

At 606, at least a first set of the sets of battery cells is prevented from supplying current to the load. At 608, at least a different, second set of the battery cells supplies current to the load. The time period during which 606 and/or 608 occurs can be referred to as the high demand time period described above. The battery cells that are prevented from supplying current can save the energy stored in those cells, while the battery cells that are supplying current to the load can power the load during the high demand time period.

At 610, a determination is made as to whether the load is still demanding current in excess of one or more of the thresholds. For example, the current and/or power demanded by the load can be compared to the current threshold, the power threshold, and/or the pulse threshold described above. If the current and/or power demanded by the load continues to exceed one or more of these thresholds, then the battery cells that have been prevented from supplying current to the load can continue being prevented from supplying current to the load. The other battery cells (or all other battery cells) that are supplying current to the load can continue to supply current to the load. As a result, flow of the method 600 returns to 608.

On the other hand, if the current and/or power demanded by the load does not continue to exceed these thresholds, then flow of the method 600 can return to 602. For example, the battery cells that were prevented from supplying current to the load may return to supplying current to the load.

Figure 7:
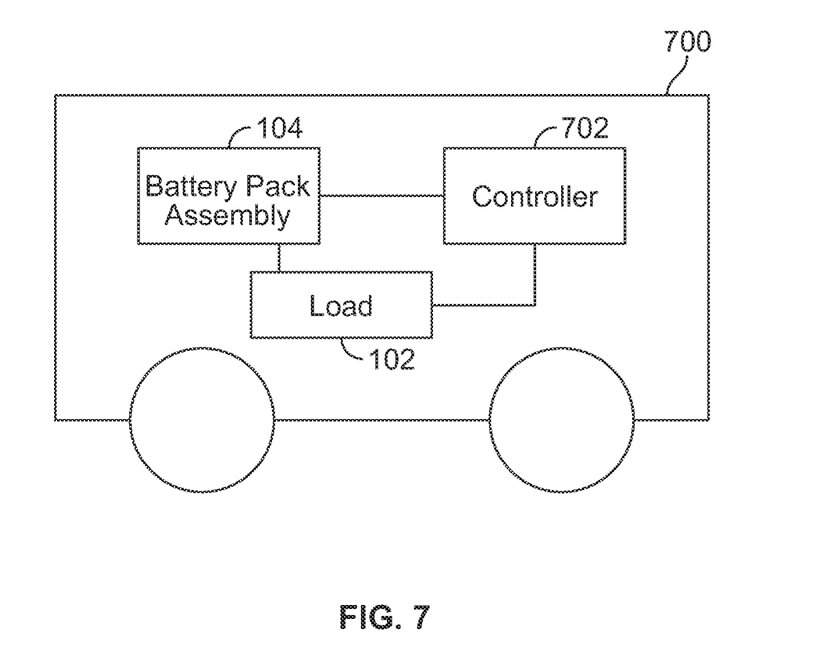
FIG. 7 illustrates a perspective view of another powered system according to another embodiment of the subject matter described herein.

FIG. 7 illustrates a perspective view of another powered system 700 according to another embodiment of the subject matter described herein. The powered system 700 includes the electronic load 102 and the battery pack assembly 104. In the illustrated embodiment, the powered system 700 can represent a vehicle, such as a hybrid vehicle, an all-electric vehicle, or another type of vehicle having one or more components (e.g., the load 102) that are powered by the battery pack assembly 104 to perform work. For example, the load 102 of the powered system 700 can represent one or more motors that rotate wheels of the powered system 700, one or more computer processors, displays, guidance systems, or the like, of the powered system 700.

The battery pack assembly 104 supplies electric current to the load 102 to power the load 102. In one aspect, the powered system 700 can include a controller 702 that monitors and/or controls operations of the powered system 700. The controller 702 can represent hardware circuits or circuitry that include and/or are connected with one or more processors (e.g., computer microprocessors, microcontrollers, or the like). The controller 702 may monitor electric demand of the load 102 to determine whether to switch which of the battery cells in the battery pack assembly 104 are to provide current to the load 102, as described herein. For example, the controller 702 can measure how much current, power, voltage, or the like, is demanded by the load 102 and compare the demanded current, power, voltage, or the like (e.g., the electric demand), to one or more designated thresholds. Responsive to the electric demand exceeding the one or more designated thresholds, the controller 106 can direct the battery pack assembly 104 to change which cells power the load 102 and which cells do not power the load 102, as described herein. Alternatively, the battery pack assembly 104 can change which cells power the load 102 without direction from the controller 702 or another component of the powered system 700. It will be readily understood that the components of the embodiments as generally described and illustrated in the figures herein, may be arranged and designed in a wide variety of different configurations in addition to the described example embodiments. Thus, the preceding description of the example embodiments, as represented in the figures, is not intended to limit the scope of the embodiments, as claimed, but is merely representative of example embodiments. Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment. Furthermore, the described features, structures, or characteristics may be combined in any suitable manner in one or more embodiments. In the preceding description, numerous specific details are provided to give a thorough understanding of embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

In accordance with at least one embodiment herein, to the extent that electronic loads are discussed herein, it should be understood that they can represent a very wide range of devices. Thus, by way of illustrative and non-restrictive examples, such loads can include laptop computers, mobile workstations, mobile telephones, tablet computers, power tools, electric and/or hybrid vehicles, lights, etc.

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

The modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. An assembly comprising:
a first battery cell supplying electric current to an electronic load; and
a second battery cell supplying electric current to the electronic load;
a first switch operatively coupled with the first battery cell and the electronic load, wherein the first switch stops conduction of the electric current to the electronic load from the first battery cell responsive to a temperature of the first switch increasing above a designated threshold temperature while the second battery cell continues supplying the electric current to the electronic load.

2. The assembly of claim 1, wherein the first switch closes to conduct the electric current from the first battery cell to the electronic load during a common time period that the second battery cell also supplies the electric current to the electronic load.

3. The assembly of claim 1, wherein the first switch closes responsive to an electric demand of the electronic load being no greater than a designated load threshold.

4. The assembly of claim 1, further comprising a second switch operatively coupled with and disposed between the second battery cell and the electronic load.

5. The assembly of claim 1, wherein the first switch includes a positive temperature coefficient device.

6. The assembly of claim 1, further comprising an anode terminal and a cathode terminal operatively coupled with the electronic load, wherein the first battery cell and the second battery cell are operatively coupled in parallel to each other between the anode terminal and the cathode terminal.

7. The assembly of claim 1, wherein the first switch also opens responsive to an increase in electric demand from the electronic load exceeding a designated load threshold.

8. A method comprising:
conducting electric current from a first battery cell and from a second battery cell of a hybrid battery pack assembly to an electronic load; and
stopping conduction of the electric current to the electronic load from the first battery cell responsive to a temperature of a first switch increasing above a designated threshold temperature while the second battery cell continues to conduct the electric current to the electronic load.

9. The method of claim 8, further comprising closing the first switch to conduct the electric current from the first battery cell to the electronic load during a common time period that the second battery cell also supplies the electric current to the electronic load.

10. The method of claim 9, further comprising closing the first switch responsive to an electric demand of the electronic load being no greater than a designated load threshold.

11. The method of claim 8, further comprising conducting the electric current from the second battery cell to the electronic load through a second switch operatively coupled with and disposed between the second battery cell and the electronic load.

12. A powered system comprising:
a battery pack assembly including a first battery cell and a second battery cell;
an electronic load consuming electric current supplied by the first battery cell and the second battery cell to perform work; and
a first switch operatively coupled with the first battery, the first switch switching to a blocking state to stop conduction of the electric current from the first battery cell to the electronic load and to a conducting state to conduct the electric current from the first battery cell to the electronic load,
wherein the first switch is in the conducting state during a low demand time period of the electronic device and while a temperature of the first switch is no greater than a designated temperature threshold, the first switch in the blocking state while the temperature of the first switch exceeds the designated temperature threshold, the low demand time period occurring responsive to an electric demand of the electronic load being no greater than a designated threshold.

13. The powered system of claim 12, further comprising a controller monitoring the electric demand of the electronic load, switching the first switch to the blocking state responsive to the electric demand of the electronic load exceeding the designated threshold, and switching the switch device to the conducting state responsive to the electric demand of the electronic load not exceeding the designated threshold.

14. The powered system of claim 12, wherein the electronic load includes one or more processors of a computing system.

15. The powered system of claim 12, wherein the electronic load includes one or more electronic components of a vehicle.

16. The powered system of claim 12, wherein the electronic load includes a power tool.

* * * * *